US006559613B1

(12) United States Patent
Elliott et al.

(10) Patent No.: US 6,559,613 B1
(45) Date of Patent: May 6, 2003

(54) METHOD FOR OPERATING AN OPEN END POWER WRENCH

(75) Inventors: David J. Elliott, Reston, VA (US); Mark W. Lehnert, Rochester Hills, MI (US)

(73) Assignee: AcraDyne, Troy, MI (US)

( * ) Notice: Subject to any disclaimer, the term of this patent is extended or adjusted under 35 U.S.C. 154(b) by 0 days.

(21) Appl. No.: 10/055,236

(22) Filed: Oct. 25, 2001

(51) Int. Cl.[7] .................................................. H02P 7/00

(52) U.S. Cl. ........................... 318/432; 318/434; 173/2; 173/4; 173/181; 173/19

(58) Field of Search ................................ 318/560, 432, 318/433, 434, 466, 468–469; 173/2, 4, 5–7, 176, 180–181, 183, 19, 140–141, 148, 216–217

(56) References Cited

U.S. PATENT DOCUMENTS 3,572,447 A * 3/1971 Pauley et al. ............... 173/182
3,926,264 A * 12/1975 Bardwell et al. ........... 173/182
4,066,942 A * 1/1978 Bardwell et al. ........... 318/434
4,175,247 A * 11/1979 Klemm ....................... 318/466
5,014,794 A * 5/1991 Hansson ..................... 173/181
5,251,706 A * 10/1993 Evans ......................... 173/29
5,636,698 A 6/1997 Estep et al.
5,814,959 A * 9/1998 Nonaka et al. ........ 318/568.11
6,378,623 B2 * 4/2002 Kawarai ..................... 173/180
6,390,205 B2 * 5/2002 Wallgren et al. ............... 173/2
6,460,629 B2 * 10/2002 Bookshar et al. ........... 173/176

* cited by examiner

*Primary Examiner*—Marlon T. Fletcher
(74) *Attorney, Agent, or Firm*—Clark Hill PLC

(57) ABSTRACT

An open end power wrench includes an operating scheme that identifies when the item within the drive socket is an item that should be rotated by the drive socket. The method for controlling the tube nut wrench includes the steps of operating the motor to generate an output torque. The method then measures an angle of rotation through which the drive socket rotates. The angle of rotation is then compared with an angle defined by the clearance opening. The output torque is limited to a minimal torque level when the angle of rotation of the drive socket is less than the angle defined by the clearance opening. The method then increases the output torque to an operating torque level when the angle of rotation of the drive socket exceeds the angle defined by the clearance opening.

16 Claims, 4 Drawing Sheets

FIG - 1
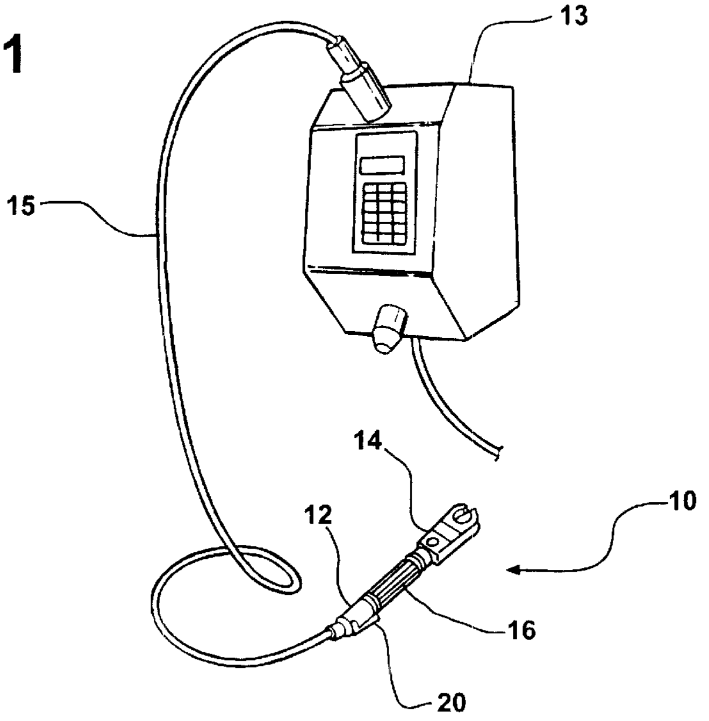
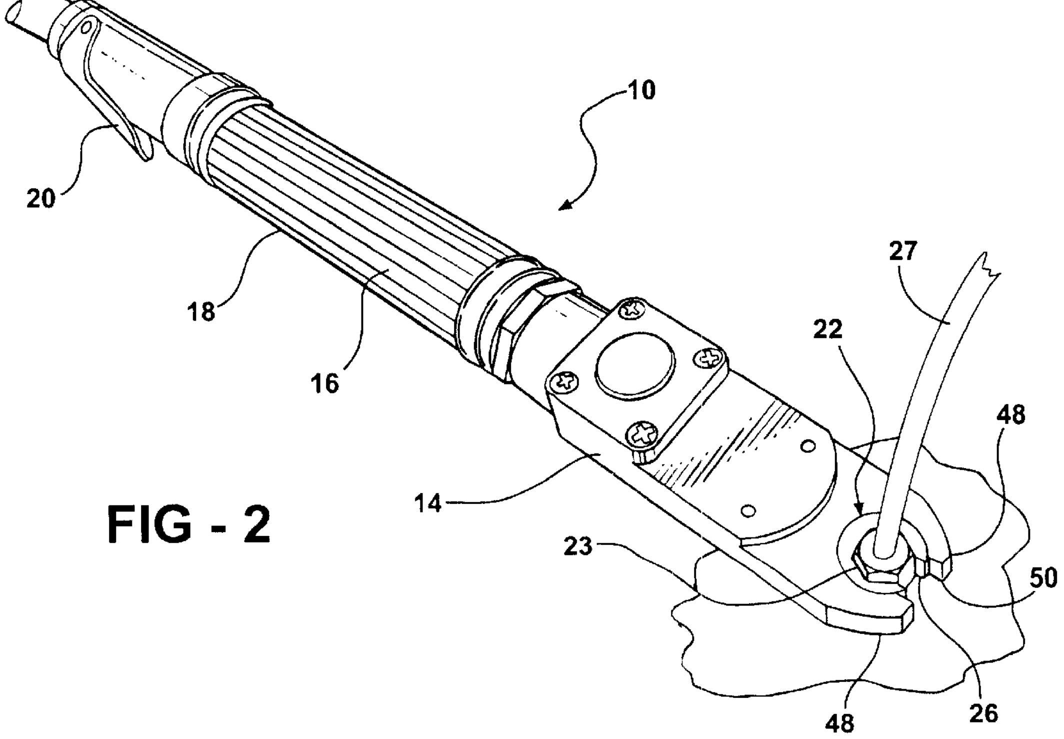
FIG - 2

METHOD FOR OPERATING AN OPEN END POWER WRENCH

BACKGROUND ART

1. Field of the Invention

The invention relates to a method for operating an open end power wrench. More particularly, the invention relates a method for controlling a drive socket on an open end power wrench by measuring parameters thereof.

2. Description of the Related Art

Open end power wrenches are used in the manufacturing of products. One type of an open end power wrench is a tube nut wrench. The tube nut wrench is designed to allow the operator thereof to tighten fasteners designed to secure hydraulic and/or pneumatic lines sharing a common centerline with the fastener. The tube nut wrench also facilitates the operator's ability to maximize torque on a fastener or part when the location of the fastener or part does not allow the operator to have a mechanical advantage over the fastener or part being worked.

U.S. Pat. No. 5,363,698, issued to Estep et al. on Jun. 10, 1997, discloses a tube nut wrench. This tube nut wrench extends from a tube nut head to a handle. A power cable or air line extends out from a distal end of the handle. The power source provides power to the tube nut wrench.

In addition, the tube nut wrench disclosed in this reference does not have any means for regulating the speed or torque output of the drive socket as the drive socket rotates through its initial open-to-close rotation. More specifically, neither this reference nor any other tube nut wrench known includes a feature designed to vary or control the speed or torque of the drive socket as the drive socket moves from its starting position through its initial closed position. Such a feature is desirable because so often the drive socket is inadvertently placed on items that are not the item to be rotated. Another situation that occurs is when a fastener is not properly aligned. In this instance, full torque on the fastener may damage the fastener or part assembly.

SUMMARY OF THE INVENTION

The invention is a method for controlling a tube nut wrench. The tube nut wrench includes a tool engaging end, a motor, a switch electrically connected to the motor for selectively operating the motor, a transmission operatively connected to the motor, a housing defining a clearance opening, and a drive socket. The drive socket is connected to the transmission and rotatable with respect to the housing. The drive socket defines a socket opening equal to the clearance opening. The method includes the steps of operating the motor to generate an output torque. The method then measures an angle of rotation through which the drive socket rotates. The angle of rotation is then compared with an angle defined by the clearance opening. The output torque is limited to a minimal torque level when the angle of rotation of the drive socket is less than the angle defined by the clearance opening. The method then increases the output torque to an operating torque level when the angle of rotation of the drive socket exceeds the angle defined by the clearance opening.

BRIEF DESCRIPTION OF THE DRAWINGS

Advantages of the invention will be readily appreciated as the same becomes better understood by reference to the following detailed description when considered in connection with the accompanying drawings, wherein:

FIG. 1 is a perspective view of a tube nut wrench connected to a power source incorporating one embodiment of the inventive method;

FIG. 2 is a perspective view of the tube nut wrench and a fastener to be tightened on a part;

FIGS. 4-1 and 4-2 are portions of a logic chart of one embodiment of the inventive method.

DETAILED DESCRIPTION OF THE PREFERRED EMBODIMENTS

Figures 1, 4:
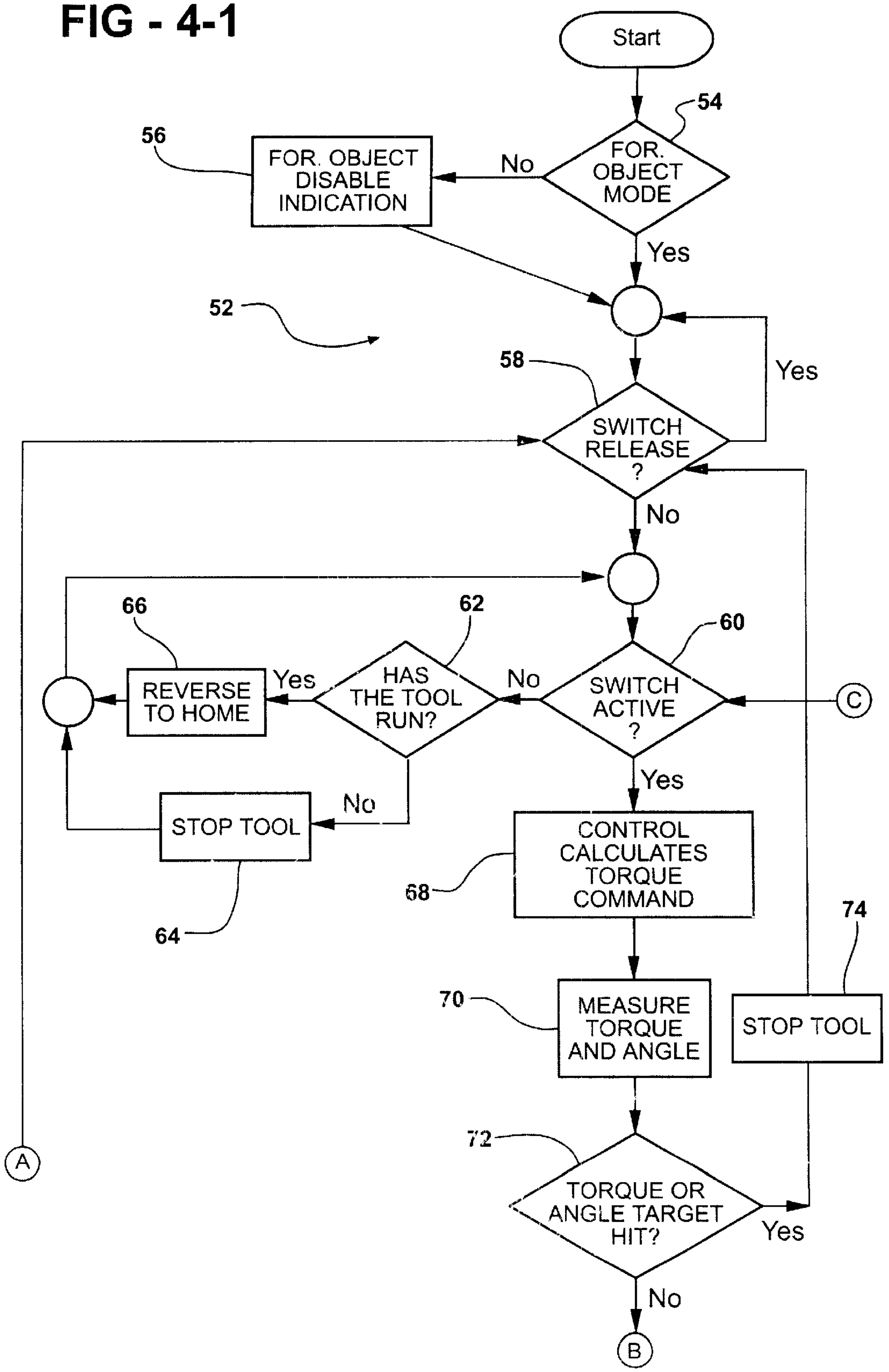

Referring to FIG. 1, one embodiment of an open end power wrench is generally indicated at 10. For purposes of simplicity, the remainder of the discussion will refer to one type of open end power wrench, i.e., a tube nut wrench 10.

The tube nut wrench 10 extends through a longitudinal axis from a handle end 12 to a tool engaging end 14. The tube nut wrench 10 has a generally cylindrical shape allowing an operator to easily handle it. A surface treatment 16 may extend along a portion of an outer surface 18 to facilitate the handling of the tube nut wrench 10. While a longitudinal ribbing is used as the surface treatment 16, it should be appreciated by those skilled in the art that any number of different surface treatments might be used without adding an inventive quality to the tube nut wrench 10.

Figure 3:
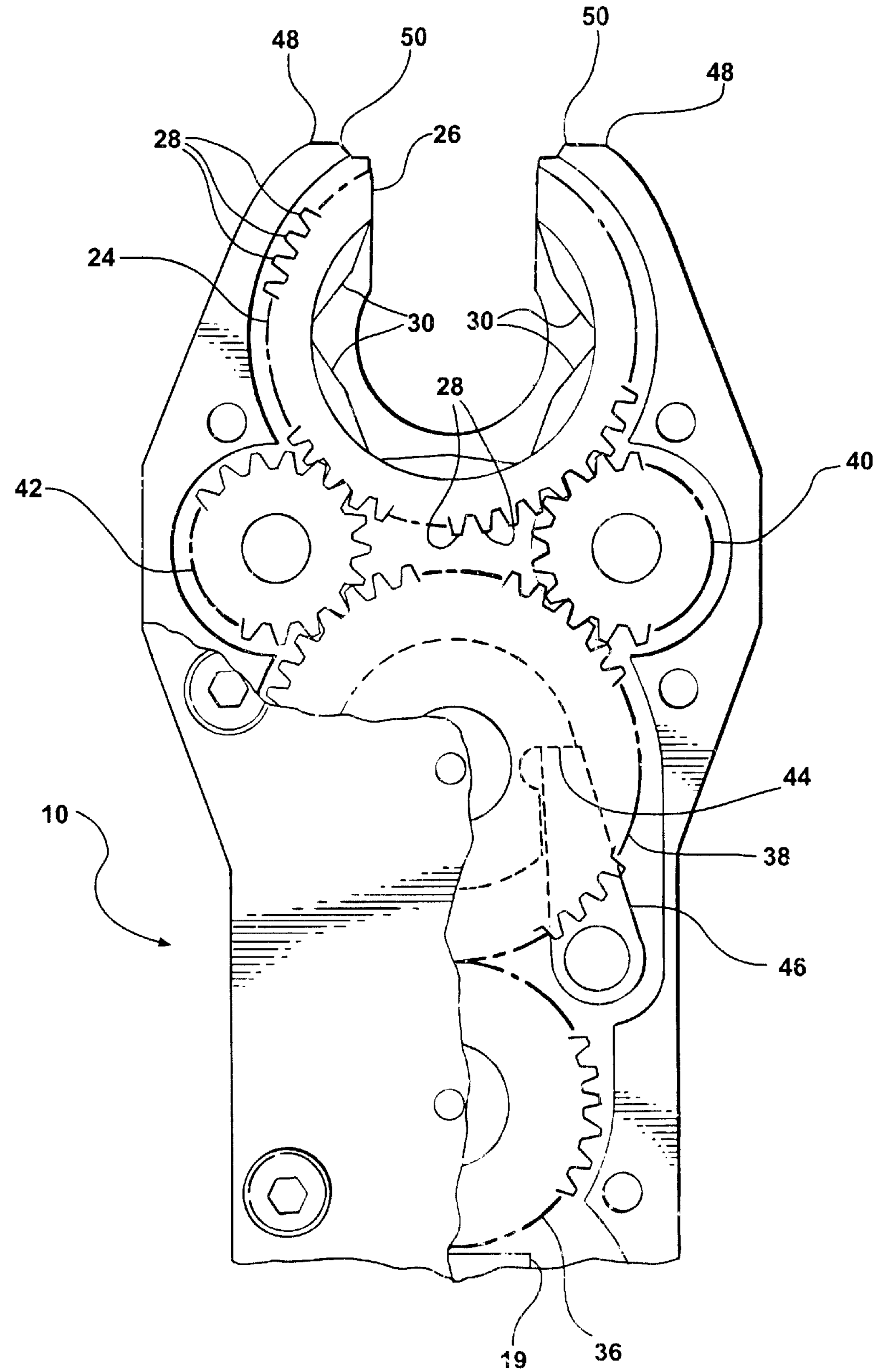
FIG. 3 is a top view, partially cut away of a tool engaging head of a tube nut wrench.

The tube nut wrench 10 includes a power supply 13 (not shown) and a motor, graphically represented at 19 in FIG. 3. The power supply 13 may be a source of electricity or a source of air. In the former case, the motor 19 is electric, whereas, in the latter case, the motor 19 is pneumatic. A plug extending out of the tube nut wrench 10 from the handle end 12 allows the tube nut wrench 10 to be connected to the power supply 13 via an electrical connection 15. The motor 19 transforms the energy received from the power source 13 into mechanical energy. In particular, the mechanical energy is the rotation of a shaft that extends through the motor 19. The motor 19 design is not a part of the inventive method.

A switch 20 also extends out from the handle end 12 of the tube nut wrench 10. The switch 20 selectively closes the circuit between the motor 19 and the battery. In the embodiment shown, the switch 20 is a dead-man switch designed to receive the palm of a hand of the operator. Other types of switches 20 may be used.

The motor 19 is operatively connected to a drive socket, generally indicated at 22. The drive socket 22 is the part of the tube nut wrench 10 that comes in direct contact with the piece, i.e., a fastener 23, that is to be rotated by the tube nut wrench 10. The rotation of the motor 19 is bidirectional. The drive socket 22 utilizes both directions of the motor 19 to move from its start orientation to its stop orientation and back again. Once the drive socket 22 has completed its operative rotation, it backtracks to its start orientation so that it may re-orient a socket opening 26 (discussed subsequently) of the drive socket 22 in the proper position for the next fastener 23 to be accessed. It should be appreciated that the backtracking does not occur until the drive socket 22 is removed from the fastener 23.

Referring to FIG. 3, the drive socket 22 includes a circular drive 24. The circular drive 24 defines a circular periphery that extends around the majority of the circular drive 24. The circular periphery is broken by the socket opening 26 that provides access into a portion of the interior of the drive socket 22. The socket opening 26 provides access to the fastener 23 when a tube 27 extends therethrough. The circular drive 24 may be characterized as a sector gear in that gear teeth 28 extend along the outer periphery that is circular. The interior of the drive socket 22 is a plurality of sides 30. While there may be any number of sides 30, the embodiment shown in FIG. 3 includes ten sides 30. The ten sides 30 correspond to receive a nut or bolt 23 in the shape of a hexagon. The eleventh and twelfth sides are missing because it provides for the socket opening 26.

A transmission 32 extends between the motor and the drive socket 22. The transmission 32 includes two drive gears 36, 38 and two engaging gears 40,42. The three drive gears 34, 36, 38 extend out from the motor 19 and transmit the rotational force generated by the motor 19 out to the drive socket 22. The two engaging gears 40, 42 are used to directly engage the gear teeth 28 of the drive socket 22 to rotate the drive socket 22 in the desired direction. Two engaging gears 40, 42 are required so that the transmission of the rotational force is not interrupted when the socket opening 26 passes thereby. Therefore, the two engaging gears 40, 42 must be spaced from each other along the circular drive 24 a distance greater than the length of the socket opening 26, and in the embodiment shown, greater than the length of one of the sides 30.

One of the drive gears 38 includes an interior stop 44. The interior stop 44 is a surface that is designed to be an abutment for a pawl 46. When the drive gear 38 is rotated (in the clockwise direction for FIG. 3), the pawl 46 hits the interior stop 44 and prevents the drive gear 38 and, hence, the drive socket 22, from rotating therepast. The interior stop 44 is positioned such that when the pawl 46 abuts thereagainst, the drive socket 22 is in its start position (FIG. 3).

The tool engaging end 14 of the tube nut wrench 10 includes a housing 48. The housing 48 holds the drive socket 22 in place with respect to the tool engaging end 14. The housing 48 is forked and defines a clearance opening 50. The clearance opening 50 is slightly larger than the socket opening 26. In the embodiment shown in the Figures, the socket opening 26 defines an angle of sixty degrees whereas the clearance opening 50 is slightly larger than that. The clearance opening 50 is oriented such that the housing 50 and socket 26 openings are aligned when the drive socket 22 is in its rest or starting position (FIG. 3).

Figures 2, 4:
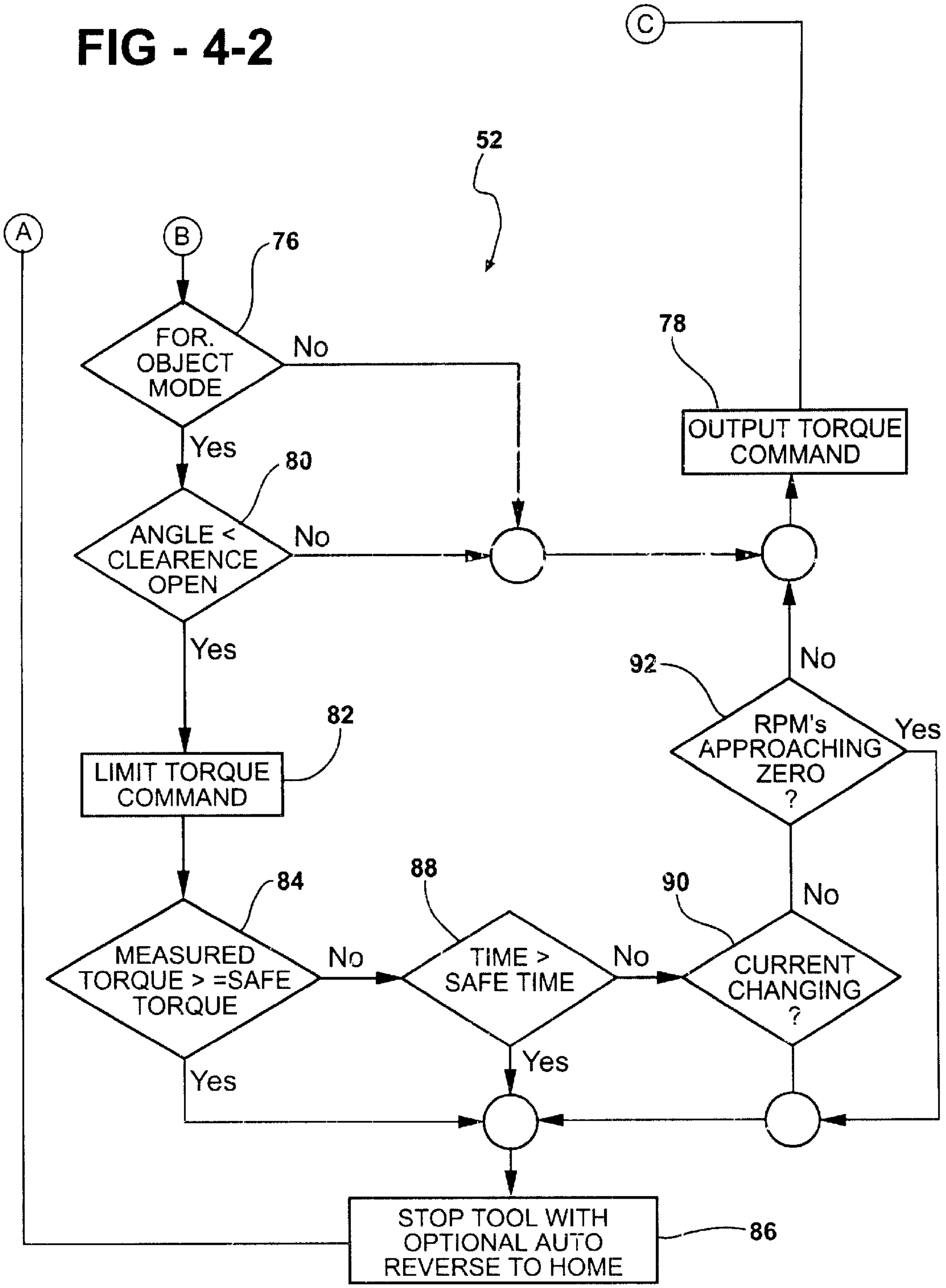

Referring to FIGS. 4-1 and 4-2, the logic chart for the inventive method is generally indicated at 52. The method 52 begins at 54 by determining whether a foreign object mode is active. If not, an indicator is activated at 56 to identify to the operator that this mode is not active.

Regardless of whether the foreign object mode is on or off, the next step of the method is to determine whether the switch 20 has been released at 58. If the switch 20 has been released, i.e., the tube nut wrench 10 is off, then the method 52 loops until the switch 20 changes states resulting in the motor being activated. If the switch 20 has not been switched to an off state, it again tests the state of the switch 20 at 60.

If the switch 20 has now been turned off, it is determined at 62 whether the tube nut wrench 10 has attempted to rotate the drive socket 22. If not, the method 52 does not run at 64 preventing the drive socket 22 from being rotated. It should be appreciated by those skilled in the art that the method 52 may replace the no run step 64 with a stop command. This would be a positive signal to tell the tube nut wrench 10 that the drive socket 22 is not to be rotated. Conversely, if the tube nut wrench 10 has run, the method 52 then reverses the motor 19 and the drive socket 22 at 66 to return the drive socket 22 to its start or home position (FIG. 3).

If the switch 20 is still active, it now calculates a full torque command at 68. The full torque command is not necessarily the full capability of the tube nut wrench 10, but the designed full torque for that particular job or task. The torque command is generated in a control unit (not shown). The full torque command is stored until it is determined that the drive socket 22 can be driven at a full torque level. It should be appreciated by those skilled in the art that the force is being identified when torque measurements are taken. Measuring a parameter to affectively measure force without measuring torque would be considered an equivalent of measuring torque.

At the same time the torque command is being generated, the tube nut wrench 10 measures the amount of torque currently being applied to the drive socket 22 by the motor 19 via the transmission 32 and the angle of rotation at which the drive socket 22 is currently positioned. This step is performed at 70. It is then determined at 72 whether the torque or angle targets have been hit. If so, a run command is not issued at 74 and the method 52 loops back to test when the switch 20 is again activated at 58.

Referring to FIG. 4-2, the method 52 continues by again testing in which mode the tube nut wrench 10 is operating. More specifically, it is determined at 76 whether the tube nut wrench 10 is operating in the foreign object mode. If the tube nut wrench 10 is not in the foreign object mode, the method 52 produces a command at 78 to output full torque. A full torque output may be factory set or it may be set by the operator. Regardless, when a full torque output command is created, the torque created by the tube nut wrench 10 will be the designated full torque. The method 52 then returns to test whether the switch 20 is still active at 60. The full torque output will continue running through the loop allowing the angle and torque measurements to be taken until one of the targets is hit or when the switch 20 is deactivated by the operator releasing it.

If the tube nut wrench 10 is operating in the foreign object mode, the angle of rotation of the drive socket 22 is measured and compared at 80 with an angle defined by the clearance opening 50. In the preferred embodiment, the compare step 80 uses an angle defined by the clearance opening 50. In the embodiment shown with a drive socket 22 having the plurality of sides 30 equating to receiving a nut or bolt 23 hexagonal in shape, the clearance opening 50 equals approximately sixty degrees.

If the angle of rotation is greater than the angle defined by the clearance opening 50, the method 52 operates the tube nut wrench 10 in the full output torque mode as shown at 78.

If the angle of rotation is less than the angle defined by the clearance opening 50, the tube nut wrench 10 limits the torque output by the motor 19 at 82. The limitation of torque prevents the tube nut wrench 10 from damaging a foreign object or a misaligned part.

Once the limit torque command has been issued, step 82, it is determined whether a measured torque generated by the tube nut wrench 10 is greater than a set torque at 84. If the measured torque is equal to or greater than the set torque, a predetermined value for the particular job being performed, then the tube nut wrench 10 is stopped at 86. Depending on the method incorporated into the tube nut wrench 10, it may automatically reverse to its start or home position, after which, the method returns to the point of determining whether the switch 20 has been released at 58. If the measured torque is not equal to or greater than the set torque, a second test is performed at 88. The second test determines whether a time of drive socket 22 rotation is greater than a set time. If the measured or elapsed time is equal to or greater than the set time, a predetermined value for the particular job being performed, then the tube nut wrench 10 is stopped at 86.

If the measured time is not equal to the set time, a third test is performed at 90. This test measures current across the motor 19 to determine whether a change occurs. In the electrical embodiment, the current is an electric current. In the pneumatic embodiment, the current is the pressure of air building up against a motor 19 that may not be turning. In the instance of an electric motor 19, if the change in the measured current is an increase greater than a predetermined value while the angle of rotation is less than the angle defined by the clearance opening 50, the tube nut wrench 10 is stopped at 86. In the instance of a pneumatic motor 19, if the change in the measured current reduces the measured current to a value approaching zero while the angle of rotation is less than the angle defined by the clearance opening 50, the tube nut wrench 10 is stopped at 86.

In an alternative pneumatic embodiment, the current measurement could be a measure of the flow of air as opposed to air pressure. In this instance, any flow decrease would indicate an object is present in the clearance opening 50 of the drive socket 22.

The three steps of measuring torque 84, measuring time 88 and measuring current 90 are performed sequentially as set forth above. In alternative embodiments, these steps 84, 88, 90 may be incorporated into the inventive method independently and exclusively of one another. In addition, derivatives of these steps may also be performed. By way of example, a test may be a measure of the angle as a function of time. This measurement could be performed in terms of revolutions per minute. As the RPMs reduce to zero, it would indicate an object is obstructing the free movement of the drive socket 22.

Again, in an alternative embodiment, a test directly measuring RPMs may be included as an independent or subsequent test at 92. A sensor (not shown) on a shaft of the motor 19 could indicate each rotation thereof. As the RPMs reduce to zero, an indication of an object being present would result in the stopping of the tube nut wrench 10 at 86.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A method for controlling an open end power wrench including a motor, a switch connected to the motor for selectively operating the motor, a transmission operatively connected to the motor, a tool engaging end having a housing defining a clearance opening, and a drive socket operatively connected to the transmission and rotatable with respect to the housing, the drive socket defining a socket opening correlating to the clearance-opening, the method including the steps of:

operating the motor to generate an output torque;

measuring an angle of rotation the drive socket rotates through;

comparing the angle of rotation with an angle defined by the clearance opening;

limiting the output of the motor to a torque level less than a level defined by the output torque; and increasing the output of the motor to the output torque when the angle of rotation exceeds the angle defined by the clearance opening.

2. A method as set forth in claim 1 including the step of measuring a torque output generated by the motor to create a measured torque output value.

3. A method as set forth in claim 2 including the step of comparing the torque output value with a predetermined torque output value.

4. A method as set forth in claim 3 including the step of stopping the motor from rotating the drive socket when the measured torque output value exceeds the predetermined torque value while the angle of rotation is less than the angle defined by the clearance opening.

5. A method as set forth in claim 4 including the step of measuring a time the motor has been generating the torque output to create an elapsed time value.

6. A method as set forth in claim 5 including the step of stopping the motor from rotating the drive socket when the elapsed time value exceeds the predetermined time value while the angle of rotation is less than the angle defined by the clearance opening.

7. A method as set forth in claim 6 including the step of measuring a current associated with the motor.

8. A method as set forth in claim 7 including the step of stopping the motor from rotating the drive socket when the current associated with the motor changes by an amount greater than a predetermined current value while the angle of rotation of the drive socket is less than the angle defined by the clearance opening.

9. A method for controlling an open end power wrench including a motor, a switch connected to the motor for selectively operating the motor, a transmission operatively connected to the motor, a tool engaging end having a housing defining a clearance opening, and a drive socket operatively connected to the transmission and rotatable with respect to the housing, the drive socket defining a socket opening correlating to the clearance-opening, the method including the steps of:

operating the motor to generate an output torque;

measuring a torque output generated by the motor to create a measured torque output value;

comparing the torque output value with a predetermined torque output value;

limiting the output of the motor to a torque level less than a level defined by the output torque; and increasing the output of the motor to the output torque when the measured torque output value maintains a level below a set torque value.

10. A method as set forth in claim 9 including the step of measuring a time the motor has been generating the torque output to create an elapsed time value.

11. A method as set forth in claim 10 including the step of performing the step of increasing the output of the motor after the elapsed time value exceeds a set time value.

12. A method as set forth in claim 11 including the step of measuring a torque output generated by the motor to create a measured torque output value.

13. A method as set forth in claim 12 including the step of comparing the torque output value with a predetermined torque output value.

14. A method as set forth in claim 13 including the step of stopping the motor from rotating the drive socket when the measured torque output value exceeds the predetermined torque value while the angle of rotation is less than the angle defined by the clearance opening.

15. A method as set forth in claim 14 including the step of measuring a current associated with the motor.

16. A method as set forth in claim 15 including the step of stopping the motor from rotating the drive socket when the current associated with the motor changes by an amount greater than a predetermined current value while the angle of rotation of the drive socket is less than the angle defined by the clearance opening.

* * * * *